Figure 8:
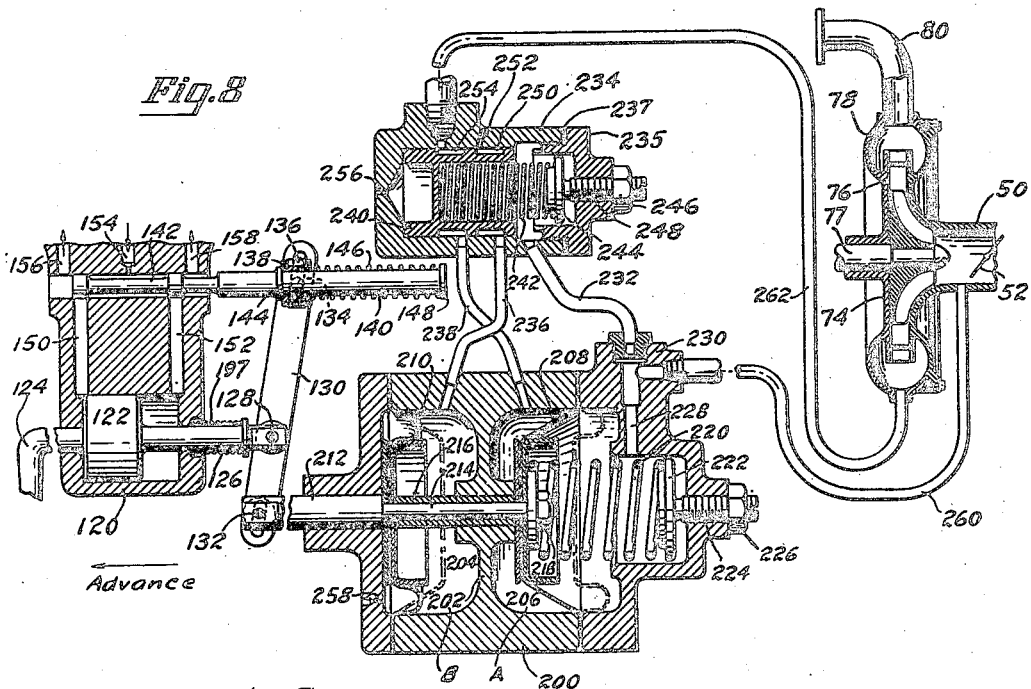

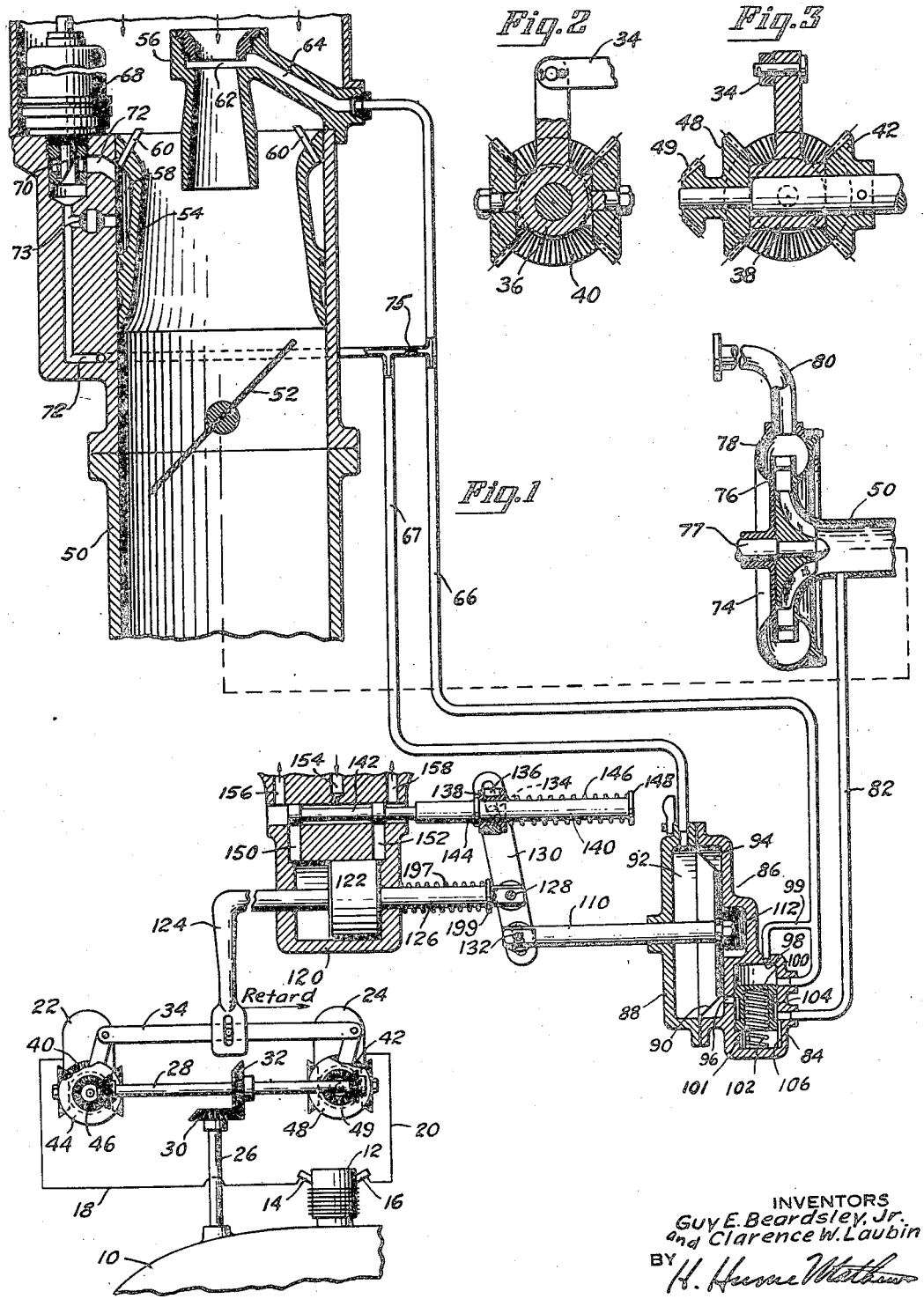

Dec. 14, 1948. G. E. BEARDSLEY, JR., ET AL 2,456,042
IGNITION TIMING
Filed July 20, 1945 3 Sheets-Sheet 2
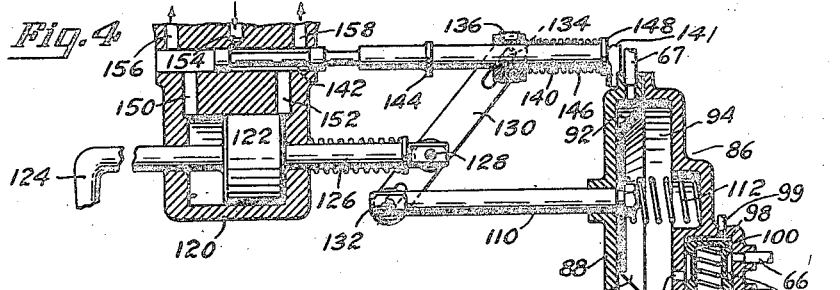
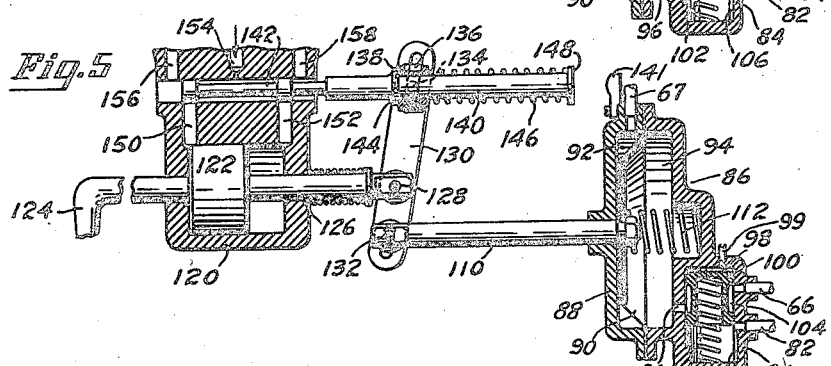
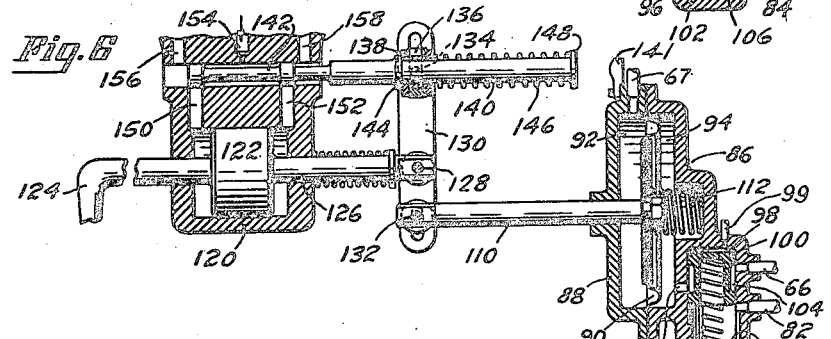
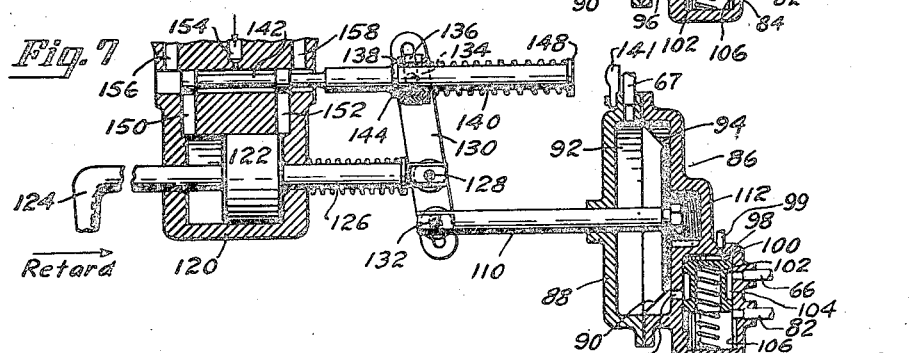
INVENTORS
Guy E. Beardsley, Jr.
and Clarence W. Laubit
BY
ATTORNEY.

INVENTORS
Guy E. Beardsley, Jr.
and Clarence W. Laubin
BY
ATTORNEY.

Patented Dec. 14, 1948

2,456,042

UNITED STATES PATENT OFFICE 2,456,042

IGNITION TIMING

Guy E. Beardsley, Jr., West Hartford, and Clarence W. Laubin, Windsor, Conn., assignors to United Aircraft Corporation, East Hartford, Conn., a corporation of Delaware Application July 20, 1945, Serial No. 606,127

12 Claims. (Cl. 123—117)

1

This invention relates to ignition timing means for engines, and particularly for supercharged internal combustion aircraft engines.

An object of this invention is to provide improved means for gradually or continuously varying the spark advance of a spark ignition engine in a predetermined manner, in at least the cruising power portion of the engine operating range.

Another object is to provide means controlled by fluid pressures in the induction passages of a supercharged aircraft engine for regulating the ignition timing of the engine in an improved manner.

Another object is to provide an automatic spark advance control for aircraft engines which gives low spark advance for starting, idling, take-off, and high power conditions and which gives a fully variable spark advance from high spark advance in the cruising power range to low spark advance at maximum power, in accordance with a predetermined curve.

A further object is to provide a new and improved engine control mechanism, particularly adapted for regulating the ignition timing of a spark ignition internal combustion engine.

Other objects and advantages will be apparent from the specification and claims and from the accompanying drawings which illustrate what are now considered to be the preferred embodiments of the invention.

In the drawings, Fig. 1 is a schematic view showing an aircraft engine ignition timing mechanism constructed according to this invention. In this figure the mechanism is shown in the engine idling, spark retarded, position.

Figs. 2 and 3 are partial sectional views of the adjustable portions of the magneto driving gear trains.

Figs. 4 to 7 inclusive are partial schematic views of the timing mechanism of Fig. 1, showing various operating positions thereof corresponding to various engine operating conditions.

Figure 9:
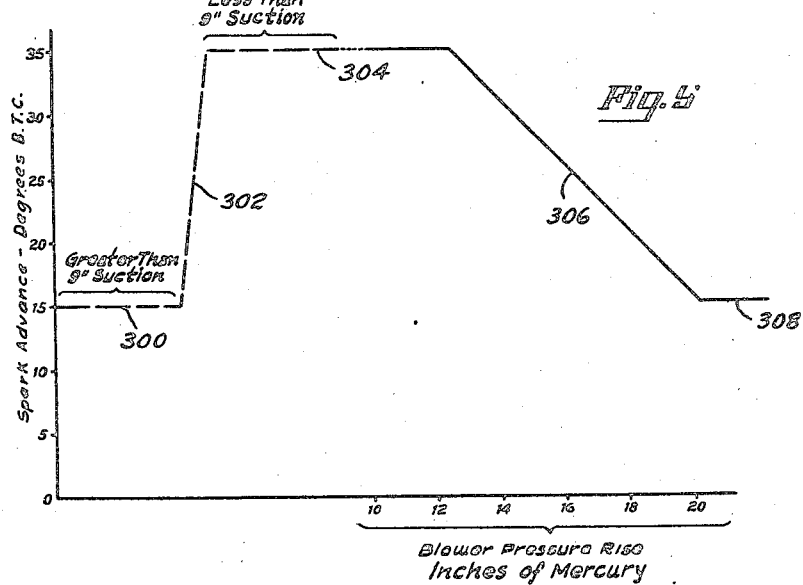

Fig. 8 is a schematic view showing a modification of the mechanism shown in Fig. 1 wherein the ignition timing is controlled solely by supercharger pressure rise, and Fig. 9 shows one form of timing chart that may be obtained with the apparatus of Fig. 8.

This invention is a modification or improvement of the inventions disclosed and claimed in the applications of John S. Hasbrouck, Serial No. 469,931, filed December 23, 1942, now Patent No. 2,390,146; Harold T. Jarvis, Serial No. 469,930, filed December 23, 1942, now Patent No. 2,373,685;

2

Wright A. Parkins et al., Serial No. 479,600, filed March 18, 1943, now Patent No. 2,390,166; and Harold T. Jarvis, Serial No. 481,114, filed March 30, 1943, now Patent No. 2,380,967; all assigned to applicant's assignee.

Referring to the drawings, Fig. 1 shows a portion 10 of an aircraft engine having radial air-cooled cylinders, one of which is shown at 12, provided with spark plugs 14, 16.

Ignition current is supplied to the plugs by leads 18, 20 from magnetos 22, 24 which are driven by the engine crankshaft (not shown) through shafts 26, 28 and bevel gears 30, 32. The timing of the magnetos (or the time with respect to piston position at which ignition current is supplied to plugs 14, 16) may be simultaneously changed by moving bar 34 lengthwise, which changes the angular position of cages 36, 38 (Figs. 2 and 3) to change the position of driven magneto gears 40, 42 with respect to the driving magneto gears 44 and 46. This mechanism is more fully described in application Serial No. 469,931.

Engine 10 is supplied with charging air in a conventional manner by the induction passage or intake manifold 50 and the supercharger 74. Air may be admitted to intake passage 50 either directly from the free airstream or from the outlet of an auxiliary stage supercharger, in a known manner.

The mass rate of flow of intake air through the passage 50 to the engine cylinders is controlled by throttle 52 and is measured by a main venturi 54 and an auxiliary venturi 56. A scoop pressure chamber 58 around the larger venturi is subjected to impact pressure of the entering air (or the total pressure ahead of the venturi) by impact tubes 60. The smaller venturi has an opening 62 at its throat portion which subjects the throat chamber 64 to the pressure at the venturi throat. For any given density of the entering air, the pressure differential between the throat chamber 64 and the scoop chamber 58 will be a function of the intake mass air flow, or the rate of flow by weight of intake air. In order to compensate this pressure difference for varying densities, an altitude compensator 68 is provided which actuates the needle valve 70 in accordance with variations in the temperature and pressure of the entering air to vary the restriction of the passage 72. A bleed 78 connects passage 72 with a conduit 66, connected to throat chamber 64. Thus, a very small flow is permitted between these two chambers by the action of the altitude compensator in an amount sufficient to compensate or modify these pressures so that the pressure differential between the conduits 67, 66 connected to the passage 72 and the throat chamber 64 is maintained as a function of the intake air mass flow, regardless of variations in temperature and pressure, or density, such as occur with variations in altitude. A manually operated by-pass valve 73 may be provided to eliminate the effect of the altitude compensator 68 when desired.

Intake air flowing through the venturi section of intake passage 50 passes to the inlet or throat of supercharger 74 and after being compressed by the supercharger, flows through the diffuser section 76 to a collector rim or discharge volute 78 and then into the engine cylinders through induction pipes, one of which is shown at 80. The supercharger is driven at a speed dependent upon engine speed by the engine crankshaft through a speed increasing gear train (not shown) connected with the impeller drive shaft 77.

Ignition timing of the engine 10 is varied by a servo-motor 120, controlled by a device 86 connected at selected points with the induction passage 50.

Control device 86 has a housing 88 containing a flexible fluid-tight diaphragm 90 separating the housing into chambers 92, and 94. Chamber 92 is connected to scoop passage 72 by conduit 67. Chamber 94 is connected to one side of a cylinder 84 by a port 96. The other side of the cylinder is connected to throat chamber 64 by conduit 66 and to the supercharger inlet by conduit 82. The top of the cylinder 84 is also connected through a restricted vent 98 and branch line 99 to the conduit 66, and the cylinder contains a reversing piston valve 100 biased upwardly by a coil spring 102. Piston 100 has an annular groove or valve port 104 intermediate its ends and cylinder 84 is provided on its inner surfaces with a by-pass passage 106 which maintains communication between the fluid in conduit 82 and the lower side of piston 100, regardless of piston position, so that the pressure on the lower side of the piston is always equal to the pressure in the conduit 50 at the blower throat, at the point where conduit 82 is connected to passage 50.

Diaphragm 90 is connected to a rod 110 which is urged to the left by a compression spring 112. When there is no fluid pressure differential acting on diaphragm 90 the diaphragm and the rod 110 will be maintained in the extreme left-hand position by spring 112. Similarly, valve piston 100 will be maintained in the extreme upper position by spring 102 when no fluid pressure differential is applied thereto.

Servo-motor 120, which moves the bar 34 to the right or left to change the ignition timing, comprises a piston 122 which actuates a piston rod having a left hand end 124 connected to bar 34. The other end 126 of the piston rod is pivoted at 128 to a lever 130 and the lever is secured by pin and slot connections at 132 to the diaphragm rod 110 and at 134 to a split ring or collar 136. Collar 136 is mounted in an annular groove or recess in the bushing 138, which is slidable on the stem 140 of the servo valve 142 between limits determined by a left hand flange 144 on the stem and a light compression spring 146 acting between a flange 148 on the right hand end of the stem and the bushing 138.

Piston 122 is actuated by oil under pressure admitted through ports 150, 152 to one or the other side of the piston. Oil is supplied to the pressure line 154 from the pressure side of the engine lubricating system, or directly from an engine driven oil pump, and is admitted to one or the other of the ports 150, 152, depending upon the axial position of valve 142. As pressure oil is admitted by the valve to the cylinder on one side of the piston, through one of the ports 150, 152, the oil is simultaneously permitted to drain from the other side of the piston through the other of the ports 150, 152. Drain lines 156, 158 may be provided for receiving the drain oil. If desired, a flow restriction may be inserted in the pressure line 154, as shown in the drawings, to limit the rate of flow of the pressure oil.

The parts are so arranged that piston 122 will assume a position dependent upon the position of control rod 110 when pressure oil is being supplied to line 154. A slight movement of the control rod 110 in one direction will cause a displacement of the valve 142 in the opposite direction which will admit pressure oil to one side or the other of piston 122 and cause it to move in the same direction as the initial movement of rod 110. As piston 122 moves, however, it returns the valve 142 to its central or closed position and thus movement of piston 122 will be stopped after it has been displaced in an amount corresponding to the original displacement of control rod 110.

In operation of the system of Fig. 1, the timing device will assume the spark retarded position shown in Fig. 4 when the engine is dead, or is not being operated. In this engine condition no pressure differential exists between the lines 66, 67 and atmospheric pressure exists in line 82. The relatively strong compression spring 197 acting between flange 199 on the piston rod 126 and the end wall of the servo-motor 120 (see Fig. 1) will return the piston 122 and bar 34 connected thereto to the retarded timing position from any previous running position. The spark is therefore maintained in the full retarded position by spring 197 for starting purposes, even though diaphragm 90 and control rod 110 are held in their extreme left hand position by spring 112. Valve 142 will be held by springs 197, 112 in its extreme right hand position abutting stop 141, with spring 146 partially compressed.

As soon as the engine is started and is operated at idling speeds, a reduced pressure or suction is developed in the passage 50 between the partially closed throttle 52 and the supercharger inlet.

This reduced pressure is applied to the bottom of piston valve 100 by line 82 and slot 106 and causes the piston valve to compress spring 102 and move downwardly from the position shown in Fig. 4. Under idling conditions the pressure in conduits 66, 99 is higher than the pressure in line 82 and a pressure differential exists across piston valve 100 which is sufficient to move it downward to a position in which it abuts the stop 101. In this position, piston valve 100 connects chamber 94 with conduit 82, by way of annular groove 104 and port 96, thus establishing blower throat pressure in chamber 94. As the mass air flow to the engine is extremely small during idling conditions, the fluid pressure in both conduits 66 and 67 will be approximately equal to the pressure of the air entering the venturi section. The pressure at the blower throat and in diaphragm chamber 94 will be much lower and the resulting pressure differential is sufficient to move diaphragm 90 to its extreme right-hand position against the action of spring 112. Thus, when the engine is idling the control device 86 will assume the operative position shown in Fig. 1. Piston 122 and bar 34 will still be maintained in their full retard position by spring 197 and the main difference between the dead engine position of Fig. 4 and the idling engine position of Fig. 1 resides in the shifting of the servo-valve 142 to its neutral or central operative position as the diaphragm 90 is moved over to the right against the action of spring 112.

As the throttle 52 is opened to increase the engine power output to the cruising power range, the pressure at the supercharger inlet 50 adjacent the connection with conduit 82 will increase, or in other words, the blower suction will drop. Thus, the pressure on the bottom side of piston valve 100 will become more nearly equal to the pressure applied by line 99 to the upper side of the piston valve, which pressure drops further and further below the pressure of the air entering the venturi as the rate of intake air flow increases. When the pressure differential between conduits 66 and 82 becomes sufficiently low, spring 102 causes piston valve 100 to rise to its extreme upper position, in which it connects line 66 with chamber 94 by way of groove 104 and port 96 and cuts off the chamber 94 from conduit 82. Vent 98 and line 99 provide the reference pressure on the upper side of the piston valve 100 when the piston valve is in its upper position. Spring 102 is so chosen as to enable the pressure differential between conduits 66, 82 to force the piston valve downward against stop 101 when blower inlet pressure is at the low value maintained under closed throttle or engine idling conditions.

Fig. 5 shows the control device in the position it assumes when the throttle 52 is advanced to cruising position. Venturi throat pressure is maintained in chamber 94 by line 66 and the compensated scoop pressure is maintained in chamber 92 by line 67. The difference between these two pressures is relatively small at the low mass air flows which exist under low engine cruising power conditions and the spring 112 is made sufficiently strong to overcome this pressure differential and move diaphragm 90 and rod 110 to their extreme left-hand position. This movement of rod 110 actuates servo-valve 142 and thereby causes piston 122 to follow the movement of the diaphragm 90, until the piston is in its extreme left-hand position in which the bar 34 and the magnetos 22 and 24 are in their fully advanced timing position.

As the throttle 52 is still further opened to increase the mass air flow, thereby increasing the engine power output, the pressure differential between lines 66 and 67 and across diaphragm 90 increases in accordance with the increase in intake mass air flow and diaphragm 90 will be gradually forced to the right by this pressure differential, against the action of the spring 112. This spring is selected to have a strength and rate sufficient to hold diaphragm 90 in its extreme left position at predetermined low cruising power outputs and to enable the pressure differential between lines 66, 67 to hold diaphragm 90 in its extreme right-hand position at predetermined high engine power outputs. At intermediate cruising powers, the spring causes the diaphragm to assume predetermined intermediate positions, dependent upon the value of the pressure differential between conduits 66, 67. One such position, the midposition, is shown in Fig. 6. Fig. 7 shows the position for high engine power output, with correspondingly high pressure differentials.

Thus, at some predetermined cruising intake mass airflow, diaphragm 90 (and consequently piston 122) will begin to move to the right and will constantly and gradually continue this movement as the mass airflow and engine power increase until the high power position of Fig. 7 is reached. The ignition timing is retarded in accordance with the right-hand movement of piston 122 and therefore will be gradually retarded from the fully advanced position of Fig. 5 to the fully retarded position of Fig. 7 in accordance with each increase in engine power.

Fig. 8 shows a modification of the spark advance device shown in Figs. 1 to 7 in which the control is obtained solely from the pressure rise across the supercharger, or the pressure difference between the intake 50 adjacent the supercharger throat and the collector chamber 78.

In this modification, the control device comprises a cylinder 200 having a central partition 202 forming chambers 204 and 206 on opposite sides thereof within which are disposed fluid-tight diaphragms 208 and 210. A rod 214 and a spacing sleeve 216 connect these diaphragms and an extension 212 of the rod projects from the cylinder 200 through one of its end closure members. Extension 212 is connected to control lever 130 of the servo-motor 120 in the same manner as rod 110 of Fig. 1. Servo-motor 120 of Fig. 8 operates in the manner described above in connection with Fig. 1, to cause the piston 122, and therefore the timing bar 34 (not shown in Fig. 8), to follow the movements of control rod or extension 212.

Diaphragms 208 and 210 and the rods 212 and 214 are biased toward their left-hand position as shown in Fig. 8 by a coil spring 220 which at one end bears against a cup member or washer fixed to the diaphragm 208 and at its opposite end against a plate 222. The position of plate 222 may be adjusted by screw 224 threaded in the right-hand closure members of cylinder 200, to vary the pressure of spring 220. A lock nut 226 may be provided for screw 224.

The space at the right of diaphragm 208 in chamber 206 communicates with a conduit 228 leading through a projection 230 formed in the right-hand closure member. Conduit 228 connects with conduit 232 leading to the right-hand portion of a control cylinder 234, within which piston valve 240 reciprocates. Space A within chamber 206 at the left of diaphragm 208 is connected by conduit 238 to the left-hand portion of cylinder 234.

The space at the left of diaphragm 210 in chamber 204 is connected to atmosphere by a restriction 258. Space B within chamber 204 at the right of diaphragm 210 is connected by conduit 236 to the intermediate portion of cylinder 234. Piston valve 240 in the cylinder 234 is biased to the left by spring 242, one end of which bears against a surface of the piston valve 240 and the opposite end against the adjustable plate 244. To affect adjustment of spring 242 to vary the force it exerts on piston valve 240, a screw 248 is provided for moving plate 244. The screw may be locked by nut 246.

After piston valve 240 and spring 242 are assembled within the cylinder 234, the cylinder is sealed by an end plate 235 threaded thereto, and in which the screw 248 is mounted. A gasket 237 forms a fluid tight joint between the cylinder and the end plate.

Piston valve 240 is provided with two circumferential channels or annular grooves 250 and 254. In the position shown, groove 250 connects pipe 236 and space B through an opening 252 to atmosphere and groove 254 connects space A to the blower rim conduit 262. In the opposite or right-hand position of piston valve 240, conduit 262 is closed off, conduit 238 and space A are connected to atmosphere through groove 254 and opening 252, and conduit 236 and space B are connected to blower throat line 232, 260 by groove 250. A restricted opening 256 to atmosphere is provided at the left end of cylinder 234, so that the left hand end of piston valve 240 is always subjected to atmospheric pressure.

In the operation of Fig. 8, the spring 197 on the servo piston rod 126 holds the piston 122 in its right hand, spark retarded, position when the engine is not operating and there is no oil pressure in line 154. Diaphragms 208, 210 and valve 240 will be held in their extreme left-hand positions by springs 220, 242, respectively.

When the engine is started, blower throat pressure immediately drops to a relatively low value (for instance 15" Hg suction, for some installations). This pressure drop is communicated to the right hand-side of valve piston 240, by lines 260, 232, thus enabling atmospheric pressure exerted on the opposite side of the valve to force it to the right against the force of spring 242 until it abuts the closure member 235. In this extreme right-hand position valve groove 254 ports conduit 238 and space A to atmosphere by way of opening 252, and valve groove 250 ports conduit 236 and space B to blower throat suction, by way of conduits 232, 260. Both diaphragms 208, 210 now have atmospheric pressure exerted on their left-hand sides and blower throat suction on their right-hand sides. The spring 220 is so selected that the force exerted by the sum of these two pressure differentials is greater than the spring force and the diaphragms and control rod 212 are therefore moved to their extreme right-hand position, compressing spring 220. As piston 122 follows the movement of control rod 212, in the manner described in connection with Fig. 1, the piston will also be moved or maintained by oil pressure to its extreme right-hand position, in which the ignition timing is fully retarded. Thus, the spark will be maintained retarded under engine idling conditions as well as under engine starting conditions.

As engine power output is increased to the cruising range, blower throat pressure rises (or suction decreases). Spring 242 is so selected as to shift piston valve 240 to its extreme left-hand position when the blower throat pressure, to which the right-hand side of the piston valve is subjected, increases to a predetermined value (for instance 9" Hg suction in some installations). In this left hand position of piston valve 240, space B is ported to atmosphere by conduit 236, groove 250 and opening 252. Diaphragm 210 is therefore subjected to atmospheric pressure on both sides and is consequently inactive. Space A, with piston valve 240 in its left-hand position, is connected to supercharger outlet pressure by conduit 238, groove 254 and conduit 262. As the right-hand side of diaphragm 208 is always subjected to blower throat pressure by passage 228, it will therefore be subjected to supercharger pressure rise whenever the piston valve 240 is in its left-hand position, which will be the case for all engine power outputs within or above the cruising power range, or in other words, whenever the blower throat pressure is above a predetermined value relative to atmospheric pressure. At low intake airflows, or in the lower portion of the cruising power range, this pressure rise across diaphragm 208 is insufficient to overcome the force of spring 220. Consequently, the diaphragm 208 and rod 212 will be moved to their extreme left-hand position, shifting the spark to fully advanced position.

As engine power is increased through and beyond the cruising power range, the supercharger pressure rise also increases, in accordance with increases in engine power. At some predetermined value of the blower rise, selected by the spring 220 (for instance 12.7" Hg rise) the pressure differential across diaphragm 208 is sufficient to begin to move the diaphragm and control rod 212 to the right, in the spark retarding direction. The diaphragm and control are then gradually or continuously moved farther to the right with each increase in blower rise (and engine power) until the fully retarded spark position is reached at high engine powers, with the control rod 212 and piston 122 in their extreme right hand position.

The action of the device in controlling ignition timing is graphically shown in Fig. 9, which shows the spark advance in degrees before top dead center in relation to blower throat suction and blower pressure rise. When the engine power output is within the idling range relatively high blower throat suction is exerted on both diaphragms 208, 210, overcoming the pressure of spring 220, and the spark will be maintained at about 15° before top dead center as indicated at 300. As the throttle is opened and the engine reaches the cruising range, blower throat suction decreases, the piston valve 240 is shifted to its left hand position by spring 242 and the spark will be immediately advanced by spring 220 to about a 35° position as shown at 302 and 304. As the throttle is further opened the spark will be maintained at the 35° position as indicated at 304 until the pressure rise across the supercharger, which is applied to diaphragm 208, becomes sufficient to overcome the force of spring 220 and then the amount of spark advance will be gradually reduced as this pressure differential moves the diaphragm 208 gradually to the right, at a rate determined by the characteristics of the spring 220, until the spark is again in the full retard position with the diaphragm in its right hand position. During this diaphragm movement the ignition timing is varied as shown by the portions 306, 308 of the chart.

It is to be understood that the invention is not limited to the specific embodiments herein illustrated and described, but may be used in other ways without departure from the spirit of the invention as defined by the following claims.

We claim:

1. In ignition timing apparatus for an engine, means responsive to a pressure difference which increases with increases in engine power, and means controlled by said pressure responsive means for gradually retarding the ignition timing of said engine in accordance with increases in said pressure difference.

2. In ignition timing apparatus for an aircraft engine, means including an intake air venturi, for establishing a fluid pressure difference which is a measure of the mass rate of flow of engine intake air at all engine altitudes, and means responsive to said pressure difference for gradually varying the ignition timing of said engine within at least a portion of the engine operating range.

3. In ignition timing apparatus for an engine having a supercharger, means responsive to the pressure rise directly across said supercharger, and means controlled by said pressure responsive means for gradually varying the ignition timing of said engine within at least a portion of the engine operating range.

4. In an ignition timing system for an aircraft engine having an air intake passage and a centrifugal blower in said passage, a throttle valve in said passage upstream of the blower inlet, means responsive to an increase in the fluid pressure in said passage between said throttle and said inlet for relatively rapidly advancing the ignition timing of said engine, and means responsive to variations in a fluid pressure difference between selected points in said intake passage for relatively slowly retarding the ignition timing of said engine.

5. The timing system of claim 4, in which said means for retarding the ignition timing is responsive to the fluid pressure difference between the inlet and outlet of said blower.

6. The timing system of claim 4, in which said means for retarding the ignition timing is responsive to a fluid pressure difference created by a venturi in said intake passage.

7. An engine ignition timing apparatus comprising, a source of fluid pressure, valve means for controlling the application of said pressure for advancing and retarding the ignition timing, means for actuating said valve means to rapidly advance the ignition timing in response to a variation in a first fluid pressure differential, and means for actuating said valve means to slowly retard the ignition timing in response to variations in a second fluid pressure differential.

8. The apparatus of claim 7, including means for maintaining the ignition timing retarded when the fluid pressure from said source is below a predetermined value.

9. In combination with an aircraft engine, a supercharger therefor, an adjustable electrical ignition mechanism, and means connected to the inlet of said supercharger for adjusting said timing device to provide low spark advance in the lower power portion of the engine operating range and a fully variable spark advance in the higher power portion of the engine operating range from high spark advance in the cruising power range to low spark advance at maximum power.

10. In combination with an engine having an adjustable ignition apparatus, an engine driven supercharger, an intake airflow measuring device for establishing a pressure head which is a measure of the rate of flow by weight of engine intake air, a servo-motor for adjusting said ignition apparatus, a fluid pressure responsive diaphragm for controlling said servo-motor, a pair of fluid chambers on opposite sides of said diaphragm, a valve having a first position in which said chambers are subjected to said pressure head and a second position in which one of said chambers is subjected to the pressure of the air entering said supercharger, and means for moving said valve between said first and second positions.

11. In combination with an engine having a throttle, a supercharger having an inlet controlled by said throttle, an adjustable electrical ignition apparatus, means including a pair of diaphragms for adjusting said apparatus, and valve means responsive to the fluid pressure at said inlet for subjecting one side of one of said diaphragms to either atmospheric pressure or to said inlet pressure in accordance with variations in said inlet pressure.

12. The combination of claim 11, in which one side of the other of said diaphragms is subjected to either atmospheric pressure or to the outlet pressure of said supercharger in accordance with variations in said inlet pressure and in which the other side of said other diaphragm is subjected to said inlet pressure at all times.

GUY E. BEARDSLEY, JR.
CLARENCE W. LAUBIN.

REFERENCES CITED

The following references are of record in the file of this patent:

UNITED STATES PATENTS

| Number | Name | Date |
|---|---|---|
| 2,268,490 | Mallory | Dec. 30, 1941 |
| 2,365,768 | Mallory | Dec. 26, 1944 |
| 2,377,566 | Mallory | June 5, 1945 |
| 2,383,898 | Udale | Aug. 28, 1945 |